United States Patent
Kyung et al.

(10) Patent No.: US 7,848,297 B2
(45) Date of Patent: Dec. 7, 2010

(54) METHOD OF GENERATING PLCM FOR BROADCAST/MULTICAST SERVICE AND APPARATUS THEREOF

(75) Inventors: Chan Ho Kyung, Incheon (KR); Jong Hoe An, Seoul (KR); Ki Jun Kim, Seoul (KR); Young Jo Lee, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 913 days.

(21) Appl. No.: 10/552,484

(22) PCT Filed: Oct. 6, 2004

(86) PCT No.: PCT/KR2004/002552

§ 371 (c)(1),
(2), (4) Date: Oct. 6, 2005

(87) PCT Pub. No.: WO2005/034531

PCT Pub. Date: Apr. 14, 2005

(65) Prior Publication Data

US 2007/0025350 A1    Feb. 1, 2007

(30) Foreign Application Priority Data

Oct. 9, 2003   (KR) .................. 10-2003-0070416
Sep. 15, 2004  (KR) .................. 10-2004-0073738

(51) Int. Cl.
*H04B 7/216*   (2006.01)
*H04B 7/00*    (2006.01)
*H04J 3/24*    (2006.01)
*H04L 12/28*   (2006.01)
*H04W 4/00*    (2009.01)
*H04W 72/00*   (2009.01)

(52) U.S. Cl. ................ 370/335; 370/390; 370/342; 370/349; 455/435.2; 455/518; 455/450

(58) Field of Classification Search ................ 370/390, 370/342, 335, 349; 455/435.2, 518, 450
See application file for complete search history.

(56) References Cited

U.S. PATENT DOCUMENTS 5,535,239 A * 7/1996 Padovani et al. ............ 370/209

(Continued)

FOREIGN PATENT DOCUMENTS

CN   1181667   5/1998

(Continued)

OTHER PUBLICATIONS

3GPP2 "Upper Layer (Layer 3) Signaling Standard for cdma2000 Spread Spectrum Systems" 3GPP2 C.S0005-d Version 1.0, Feb. 2004.

*Primary Examiner*—Vincent P Harper
*Assistant Examiner*—Ariel Balaoing
(74) *Attorney, Agent, or Firm*—Lee, Hong, Degerman, Kang & Waimey

(57) ABSTRACT

A method of generating a public long code mask for a broadcast/multicast service and apparatus thereof are provided, by which, upon performing the broadcast/multicast service, an overhead of a base station or a mobile terminal can be reduced and a delay occurring in the base station or mobile terminal can be reduced. In a method of carrying out a broadcast/multicast service provided via a channel of a mobile communication system, the method includes steps of receiving a flow identifier indicative of the broadcast/multicast service; and generating, based on the received flow identifier, a public long code mask for the channel providing the broadcast/multicast service.

20 Claims, 5 Drawing Sheets

| HEADER | FIRST_FLOW_ID | FSCH_ID |
|---|---|---|

U.S. PATENT DOCUMENTS

| | | | | |
|---|---|---|---|---|
| 5,721,957 | A | * | 2/1998 | Huang et al. .................. 710/66 |
| 5,757,796 | A | * | 5/1998 | Hebb ......................... 370/393 |
| 5,887,252 | A | | 3/1999 | Noneman |
| 6,188,767 | B1 | * | 2/2001 | Needham et al. ............ 380/271 |
| 6,519,239 | B1 | * | 2/2003 | Panchal et al. .............. 370/335 |
| 2002/0016851 | A1 | * | 2/2002 | Border ....................... 709/234 |
| 2004/0037237 | A1 | * | 2/2004 | Lalwaney .................. 370/320 |
| 2004/0213280 | A1 | * | 10/2004 | Patel .......................... 370/441 |
| 2005/0025082 | A1 | * | 2/2005 | Jang et al. ................... 370/312 |

FOREIGN PATENT DOCUMENTS

| | | |
|---|---|---|
| EP | 0 828 355 A2 | 3/1998 |
| WO | WO 01/37453 A1 | 5/2001 |

* cited by examiner

FIG. 2

| 1 | 1 | 0 | 0 | 0 | 1 | 0 | 0 | 0 | 0 | BCMC_FLOW_ID |

FIG. 3

| 1 | 1 | 0 | 0 | 0 | 1 | 0 | 0 | 0 | 1 | BCMC_FLOW_ID |

FIG. 4

| 1 | 1 | 0 | 0 | 0 | 1 | 0 | 0 | 0 | 1 | FIRST_FLOW_ID |

FIG. 5

| HEADER | FIRST_FLOW_ID | FSCH_ID |

FIG. 6

| 41 40 39 | 38 ... 7 | 6 ... 0 |
|---|---|---|
| 1 1 0 | FIRST_FLOW_ID | FSCH_ID |

FIG. 7

| 41 ... 36 | 35 ... 4 | 3 ... 0 |
|---|---|---|
| 1 1 0 0 0 1 | FIRST_FLOW_ID | FSCH_ID_LSB_4 |

FIG. 8

| 41 ... 35 | 34 ... 3 | 2 1 0 |
|---|---|---|
| 1 1 0 0 0 1 1 | FIRST_FLOW_ID | FSCH_ID_LSB_3 |

FIG. 9

| 41 ... 35 | 34 ... 23 | 22 ... 7 | 6 ... 0 |
|---|---|---|---|
| 1100011 | PAD | FIRST_FLOW_ID (16) | FSCH_ID |

FIG. 10

| 41 ... 35 | 34 ... 31 | 30 ... 7 | 6 ... 0 |
|---|---|---|---|
| 1100011 | PAD | FIRST_FLOW_ID (24) | FSCH_ID |

FIG. 11

| 41 40 39 | 38 ... 7 | 6 ... 0 |
|---|---|---|
| 1 1 0 | FIRST_FLOW_ID (32) | FSCH_ID |

FIG. 12

| 41 ... 35 | 34 ... 3 | 2 1 0 |
|---|---|---|
| 1 1 0 0 0 1 1 | FIRST_FLOW_ID | FIRST_BSR_ID |

FIG. 13

| | | 9 ... 3 | 2 1 0 |
|---|---|---|---|
| HEADER (n) | PAD (32−n) | FSCH_ID | FIRST_BSR_ID |

METHOD OF GENERATING PLCM FOR BROADCAST/MULTICAST SERVICE AND APPARATUS THEREOF

CROSS-REFERENCE TO RELATED APPLICATIONS

This application is a 371 U.S. national stage application of International Application No. PCT/KR2004/002552, filed on Oct. 6, 2004, which claims the benefit of earlier filing date and right of priority to Korean Application No. 10-2003-0070416, filed on Oct. 9, 2003, and Korean Application No. 10-2004-0073738, filed on Sep. 15, 2004, the contents of which are hereby incorporated by reference herein in their entirety.

TECHNICAL FIELD

The present invention relates to a method of generating a public long code mask (PLCM) for use in a mobile communication system, such as CDMA2000, and more particularly, to a PLCM generating method applicable to a broadcast/multicast (BCMC) service provided in such a system.

BACKGROUND ART

A long code is used for channel encryption in a forward channel and to determine the location of a power control bit. The long code also serves to identify terminals operating in a reverse channel and to reduce interference with the signals transmitted by other terminals. The generation of a general long code is illustrated in FIG. 1.

Referring to FIG. 1, a long code 13 is generated from a long code generator 12 according to a long code mask 11 and generally has a length of 42 bits. Then, a mobulo-2 inner product operation 15 is performed using a transmission signal (X) 14 and the long code (Y) 13.

Methods of performing a broadcast/multicast service in the CDMA2000 system require the allocation of a public long code mask using specific identifiers (ID information) as a reference for PLCM allocation, and the ID information may be taken from the respective subscribers or the broadcast/multicast service itself. It is more efficient to use the broadcast/multicast service as the reference, whereby one public long code mask is allocated to each group of subscribers using the broadcast/multicast service, rather than allocating a public long code mask to each subscriber (user).

It is also efficient to assign one physical channel to each service by taking the broadcast/multicast service as a reference, so that the assigned physical channel can be shared by various users. The shared physical channel for providing a broadcast/multicast service may be a forward fundamental channel (F-FCH) or a forward supplemental channel (F-SCH). Hence, the F-FCH channel is a forward broadcast fundamental channel (F-BFCH), and the F-SCH channel is a forward broadcast supplemental channel (F-BSCH). Regardless of the physical channel shared, however, a user group having the same Walsh code and public long code mask for a given service shares one channel that is assigned to one broadcast/multicast service, which defines a specific identifier (BCMC_FLOW_ID) for the provided service, so that one channel and one PLCM are assigned to the identifier. That is, each service has it own service identifier, which differs for the Walsh code and PLCM used for the corresponding channel, and the service identifier is generated by a base station and is transmitted to a mobile station.

Meanwhile, the PLCM used for F-BFCH and F-BSCH channels must be newly generated (assigned), to be distinguishable from a PLCM used for each user's previous forward or reverse fundamental channel and forward or reverse supplemental channel. The newly assigned PLCM cannot overlap (coincide with) a PLCM currently used by a base station controller. Avoiding this necessitates a transfer of the PLCM from a base station or anchor base station to the base station controller, i.e., a higher layer, resulting in an undesirable delay and complicating the related network functions.

DISCLOSURE OF INVENTION

Accordingly, the present invention is directed to a method of generating a public long code mask for a broadcast/multicast service and apparatus thereof that substantially obviates one or more problems due to limitations and disadvantages of the related art.

An object of the present invention is to provide a method of generating a public long code mask for a broadcast/multicast service and apparatus thereof, by which an overhead of a base station or a mobile terminal can be reduced upon performing the broadcast/multicast service.

Another object of the present invention is to provide a method of generating a public long code mask for a broadcast/multicast service and apparatus thereof, by which a delay occurring in a base station or a mobile terminal can be reduced upon performing the broadcast/multicast service.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of carrying out a broadcast/multicast service provided via a channel of a mobile communication system. The method comprises steps of receiving a flow identifier indicative of the broadcast/multicast service; and generating, based on the received flow identifier, a public long code mask for the channel providing the broadcast/multicast service.

In another aspect of the present invention, there is provided a method of providing a broadcast/multicast service provided in a mobile communication system. The method comprises steps of assigning a forward channel to a broadcast/multicast service; generating a flow identifier of the broadcast/multicast service; and generating, based on the generated flow identifier, a public long code mask for the assigned forward channel.

In another aspect of the present invention, there is provided a method of carrying out a broadcast/multicast service provided via a channel of a mobile communication system. The method comprises steps of generating, based on a flow identifier indicative of a broadcast/multicast service, a public long code mask for the channel providing the broadcast/multicast service; multiplexing the generated public long code mask with a transmission signal; and transmitting the multiplexed signal.

In another aspect of the present invention, there is provided a method of carrying out a broadcast/multicast service provided via a channel of a mobile communication system. The method comprises steps of generating, based on a flow identifier indicative of a broadcast/multicast service, a public long code mask for the channel providing the broadcast/multicast service; multiplexing the generated public long code mask with a received signal; and decoding the multiplexed signal.

In another aspect of the present invention, there is provided a method of simultaneously receiving a plurality of broadcast/multicast services via a forward channel of a mobile communication system. The method comprises steps of receiving a plurality of flow identifiers respectively indicative of the plurality of broadcast/multicast services; selecting one of the received flow identifiers; and generating, based on the selected flow identifier, a public long code mask for the forward channel.

In another aspect of the present invention, there is provided a method of receiving a broadcast/multicast service simultaneously via a plurality of forward broadcast supplemental channels of a mobile communication system. The method comprises steps of receiving a flow identifier indicative of the broadcast/multicast service; and generating a public long code mask, using the received flow identifier and a predetermined portion of a channel identifier for identifying the corresponding forward broadcast supplemental channel.

In another aspect of the present invention, there is provided, in a mobile communication system receiving one broadcast/multicast service data flow separated into at least two data flows via at least two forward broadcast supplemental channels, a public long code mask generating method. The method comprises steps of receiving a flow identifier for identifying the broadcast/multicast service; and generating a public long code mask using a first flow identifier allocated to each of the channels and a specific service flow identifier for identifying a specific broadcast/multicast service data flow within the respective forward broadcast supplemental channels.

In another aspect of the present invention, there is provided, in a mobile communication system receiving one broadcast/multicast service data flow separated into at least two data flows via at least two forward broadcast supplemental channels, a public long code mask generating method. The method comprise steps of receiving a first broadcast/multicast service flow identifier allocated to the corresponding forward broadcast supplemental channel; and generating a public long code mask using a channel identifier identifying the corresponding forward broadcast supplemental channel and a first specific service flow identifier corresponding to the first broadcast/multicast service flow identifier in the corresponding forward broadcast supplemental channel, wherein the specific service flow identifier identifies a specific broadcast/multicast service data flow in each of the corresponding forward broadcast supplemental channels.

In another aspect of the present invention, there is provided, in a network multiplexing to transmit data flows of at least two broadcast/multicast services via one forward channel, a public long code mask generating method. The method comprises steps of generating flow identifiers for identifying the at least two broadcast/multicast services, respectively; selecting one of the generated at least two flow identifiers; and generating a public long code mask using the selected flow identifier.

In another aspect of the present invention, there is provided, in a network transmitting one broadcast/multicast service data flow via at least two forward broadcast supplemental channels, a public long code mask generating method. The method comprises steps of generating a flow identifier for identifying a corresponding broadcast/multicast service; and generating a public long code mask using the generated flow identifier and a predetermined portion of a channel identifier for identifying the corresponding forward broadcast supplemental channel.

In another aspect of the present invention, there is provided, in a network transmitting one broadcast/multicast service data flow via at least two forward broadcast supplemental channels, a public long code mask generating method. The method comprises steps of generating a flow identifier for identifying a corresponding broadcast/multicast service; and generating a public long code mask using the generated flow identifier and a specific service flow identifier for identifying a specific broadcast/multicast service data flow within the corresponding forward broadcast supplemental channel.

In another aspect of the present invention, there is provided, in a network transmitting at least two separated data flows of one broadcast/multicast service via at least two forward broadcast supplemental channels, a public long code mask generating method. The method comprises steps of generating a flow identifier for identifying the broadcast/multicast service; and generating a public long code mask using a channel identifier for identifying each of the corresponding forward broadcast supplemental channels and a specific service flow identifier for identifying a specific data flow within each of the corresponding forward broadcast supplemental channels.

In another aspect of the present invention, there is provided a mobile terminal comprising a first module for receiving and storing a flow identifier for a broadcast/multicast service; and a second module for generating a public long code mask to be used in a channel for the broadcast/multicast service upon providing the broadcast/multicast service using the flow identifier for the broadcast/multicast service.

In another aspect of the present invention, there is provided a base station comprising a first module for assigning one forward channel to one broadcast/multicast service, the first module generating a flow identifier of the broadcast/multicast service; and a second module for generating a public long code mask for the assigned forward channel using the generated flow identifier upon providing the broadcast/multicast service.

In another aspect of the present invention, there is provided a mobile terminal in a communication system receiving a data flow for each of at least two multiplexed broadcast/multicast services via one forward channel. The mobile terminal comprises a first module for receiving flow identifiers for respectively identifying the at least two broadcast/multicast services; a second module for selecting one of the received flow identifiers; and a third module for generating a public long code mask using the selected flow identifier.

In another aspect of the present invention, there is provided a mobile terminal in a communication system separately receiving at least two data flows of one broadcast/multicast service via at least two forward broadcast supplemental channels. The mobile terminal comprises a first module for receiving a flow identifier for identifying the broadcast/multicast service; and a second module for generating a public long code mask using the received flow identifier and a predetermined portion of a channel identifier for identifying the corresponding forward broadcast supplemental channel.

In another aspect of the present invention, there is provided a mobile terminal in a communication system separately receiving at least two data flows of one broadcast/multicast service via at least two forward broadcast supplemental channels. The mobile terminal comprises a first module for receiving a flow identifier for identifying the broadcast/multicast service; and a second module for generating a public long code mask using a first flow identifier allocated to each of the at least two forward broadcast supplemental channels and a specific service flow identifier for identifying a specific broadcast/multicast service data flow within each of the forward broadcast supplemental channels.

In another aspect of the present invention, there is provided a mobile terminal in a communication system separately receiving at least two data flows of one broadcast/multicast service via at least two forward broadcast supplemental channels. The mobile terminal comprises a first module for receiving a first broadcast/multicast service flow identifier allocated to the corresponding forward broadcast supplemental channel; and a second module for generating a public long code mask using a channel identifier for identifying the corresponding forward broadcast supplemental channel and a first specific service flow identifier corresponding to the first broadcast/multicast service flow identifier within the corresponding forward broadcast supplemental channel, wherein the specific service flow identifier identifies a specific broadcast/multicast service data flow in each of the corresponding forward broadcast supplemental channels.

The above implementations consider a mobile terminal as an example but are equally applicable to a base station in the same manner.

The flow identifier used in generating the public long code mask is for the first broadcast/multicast service allocated to the corresponding forward channel or the first service identifier corresponding to the first broadcast/multicast service flow identifier.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram of a PLCM generated for a F-BFCH channel according to the present invention;

FIG. 3 is a diagram of a PLCM generated for a F-BSCH channel according to the present invention;

FIG. 4 is a diagram of a PLCM generated using one of a plurality of broadcast/multicast service flow identifiers assigned to the F-BSCH channel, as in FIG. 3;

FIG. 5 is a diagram of a PLCM generated a channel identifier, when one broadcast/multicast service is transmitted via various F-BSCH channels, according to one embodiment of the present invention;

FIGS. 6-8 are diagrams of a PLCM generated using respective examples of the channel identifier of FIG. 5;

FIGS. 9-11 are diagrams of a PLCM generated using examples of the first broadcast/multicast service flow identifier, respectively;

FIG. 12 is a diagram of a PLCM generated using a BSR_ID identifier, when one broadcast/multicast service is transmitted via various F-BSCH channels, according to another embodiment of the present invention; and FIG. 13 is a diagram of a PLCM generated using FSCH_ID and BSR_ID identifiers, when one broadcast/multicast service is transmitted via various F-BSCH channels, according to yet another embodiment of the present invention.

BEST MODE FOR CARRYING OUT THE INVENTION

Figure 1:
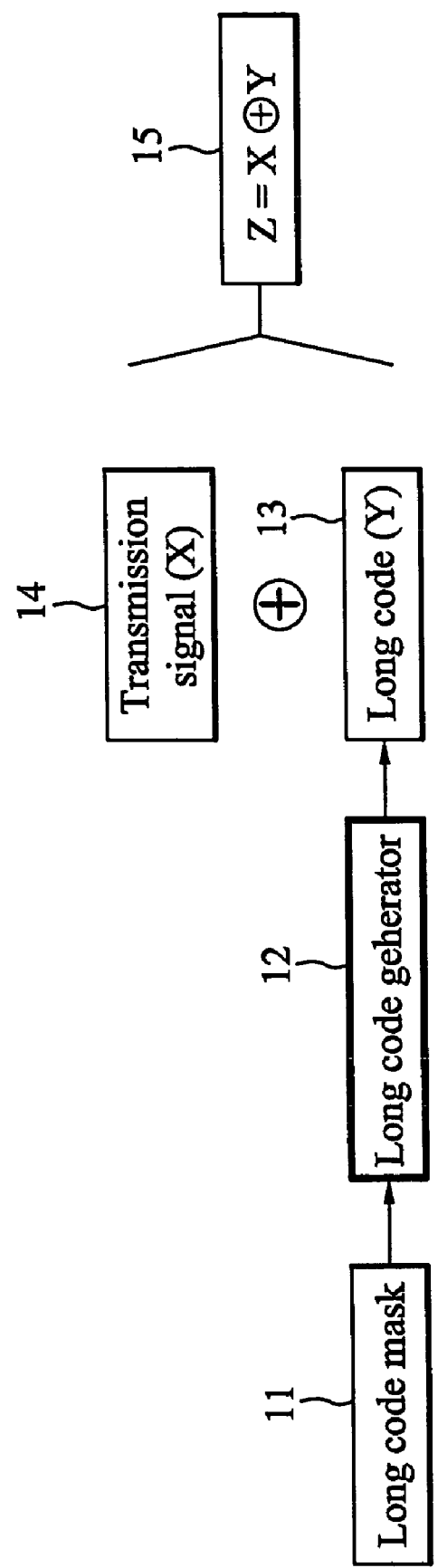
FIG. 1 is a block diagram of a general long code generating method according to a background art.

Reference will now be made in detail to the preferred embodiments of the present invention, examples of which are illustrated in the accompanying drawings. Wherever possible, the same reference numbers will be used throughout the drawings to refer to the same or like parts.

In the following detailed description of the present invention, it is assumed that the PLCM has a length of 42 bits. This bit length, however, may be set according to currently applicable standards.

Meanwhile, the first ten bits (upper ten bits) has been allocated for the header of a 42-bit PLCM, and in generating such a PLCM for F-BFCH or F-BSCH channel use, it should be appreciated that an assignment of a header value coinciding with (overlapping) any previously used public long code mask, or long code mask, is to be avoided. FIGS. 2 and 3 each show a PLCM generated according to the present invention, where the PLCM of FIG. 2 is generated for the F-BFCH channel and has a header value of "11100010000" and the PLCM of FIG. 3 is generated for the F-BSCH channel and has a header value is "1100010001."

Referring to FIGS. 2 and 3, after the upper ten bits are allocated as above, a broadcast/multicast service flow identifier (BCMC_FLOW_ID) is allocated to the lower 32 bits and may have a set length of 16 bits, 24 bits, or 32 bits. In the case of a 16-bit or 24-bit identifier, the remainder of the allocation is padded, i.e., filled with 0s or 1s. The contents of the flow identifier is generated for a specific broadcast/multicast service and is multiplexed with a transmission signal. Then, based on a broadcast/multicast service flow identifier as above, a public long code mask is generated for a forward channel providing the broadcast/multicast service and is multiplexed with a received signal, to be decoded on a receiving side. To carry out a broadcast/multicast service provided via a forward channel of a mobile communication system, a flow identifier indicative of the broadcast/multicast service is received, and, based on the received flow identifier, a public long code mask is generated for the channel providing the broadcast/multicast service. The received flow identifier can be stored in a memory of a mobile station or a base station.

In the event of transmitting a plurality of broadcast/multicast service flow identifiers, each assigned to one F-BSCH channel, the PLCM can be generated using any one of the flow identifiers. According to a preferred embodiment of the present invention, a first broadcast/multicast service flow identifier (FIRST_FLOW_ID), as shown in FIG. 4, is selected. That is, if the data of two or more broadcast/multicast services are multiplexed into one F-BSCH channel to be transmitted, one broadcast/multicast service flow identifier can be selected for use in generating a PLCM for the multiplexed channel, and the selected flow identifier is preferably the first broadcast/multicast flow identifier allocated to the corresponding F-BSCH channel.

On the other hand, if the data of one broadcast/multicast service is divided for transmission via more than one F-BSCH channel, PLCM generation requires an additional identifier, i.e., a channel identifier (FSCH_ID) as shown in FIG. 5, in which the generated PLCM uses a channel identifier, in addition to the BCMC_FLOW_ID identifier of FIGS. 2 and 3 or the FIRST_FLOW_ID identifier of FIG. 4, according to a first embodiment of the present invention. That is, the channel identifier indicates a specific F-BSCH channel and is included in the PLCM generated when providing one broadcast/multicast service via multiple F-BSCH channels.

The configuration of the PLCM shown in FIG. 5 may be varied according to the lengths of the FSCH_ID identifier and the header. That is, though an FSCH_ID identifier normally consists of seven bits, as shown in FIG. 6, the PLCM can be variously configured. Particularly, if a seven-bit FSCH_ID identifier is deemed too long to generate the PLCM, a reduced number of bits may be allocated to the FSCH_ID identifier, to produce an FSCH_ID identifier length of four bits as shown in FIG. 7 or of three bits as shown in FIG. 8. The FSCH_ID identifier may be reduced to a length of five bits, whereupon the header value is "11000" or "00xxx" or to a length of six bits, whereupon the header value is "1100" or "00xx."

Referring to FIGS. 6-8, illustrating a PLCM generated using an FSCH_ID identifier according to examples of first embodiment of the present invention, a broadcast/multicast service flow identifier (BCMC_FLOW_ID) for generating the PLCM configured as in FIG. 5 enables use of a full length channel identifier (FSCH_ID) or reduced length channel identifiers of four bits or three bits, respectively. In either case, the broadcast/multicast service flow identifier may have a length of 16, 24, or 32 bits. If the broadcast/multicast service flow identifier has a length of 16 bits or 24 bits, the public long code mask is padded by filling the remaining bits with 0s or 1s. In the example of FIG. 6, the entire FSCH_ID identifier is used with a header having a value of "110," but a header value of "000" or "001" may be used to avoid collision with other channels. In the example of FIG. 7, only the four least significant bits (FSCH_ID_LSB_4) of the channel identifier are used with a header value of "110001," a header value of "00xxxx" may be used to avoid collision with other channels. In the example of FIG. 8, only the three least significant bits (FSCH_ID_LSB_3) of the channel identifier are used with a header value of "1100011," a header value of "1100001" or "1100010" may be used to avoid collision with other channels.

In the examples of FIGS. 6-8, the FIRST_FLOW_ID identifier is the first BCMC_FLOW_ID identifier allocated to the corresponding F-BSCH channel. In each case, however, the BCMC_FLOW_ID identifier may have a length of 16, 24, or 32 bits, as shown in the examples of FIGS. 9, 10, and 11, respectively. When the BCMC_FLOW_ID identifier length is less than 32 bits, the unoccupied (unallocated) bits of the 32-bit allocation are filled with 0s or 1s, i.e., the FIRST_FLOW_ID identifier is padded so that the entire 32-bit allocation is occupied. Here, the padding is provided to the upper bits of the 32-bit allocation.

In the examples of FIGS. 9 and 10, BCMC_FLOW_ID identifiers of 16 bits and 24 bits are used with a seven-bit FSCH_ID identifier and a seven-bit header, so that the 42-bit PLCM length requires padding lengths of twelve bits and four bits, respectively. Here, as in the case of the example of FIG. 8, the header value is "1100011," but a header value of "1100001" or "1100010" may also be used to avoid collision with other channels. The example of FIG. 11, however, requires no padding since the BCMC_FLOW_ID identifier occupies the entire 32-bit allocation, with a seven-bit FSCH_ID identifier and a three-bit header completing the 42-bit length of the PLCM. In this example, as in the case of the example of FIG. 6, the header value is "110," but a header value of "000" or "001" may also be used to avoid collision with other channels.

FIG. 12 illustrates an example of a PLCM generated using a BSR_ID identifier, when one broadcast/multicast service is transmitted via various F-BSCH channels, according to another embodiment of the present invention. Here, the PLCM includes a specific service flow identifier (BSR_ID), which is indicative of a specific BCMC data flow on one of the F-BSCH channels and is preferably a first BSR_ID identifier (FIRST_BSR_ID), and the first broadcast/multicast service flow identifier (BCMC_FLOW_ID). As in the case of the first embodiment, the BCMC_FLOW_ID identifier may be set as the FIRST_FLOW_ID identifier.

Accordingly, the PLCM configuration of FIG. 12 is a modification of the first embodiment of the present invention. That is, the BSR_ID identifier is used in addition to the BCMC_FLOW_ID identifier of FIGS. 2 and 3 or the FIRST_FLOW_ID identifier of FIG. 4, to generate a PLCM according to a second embodiment of the present invention. As in the case of the first embodiment, the broadcast/multicast service flow identifier may have a length of 16, 24, or 32 bits, and the generated PLCM is padded if the broadcast/multicast service flow identifier has a length of less than 32 bits. Here, too, as in the case of the examples of FIGS. 8-10, the header value is "1100011," but a header value of "1100001" or "1100010" may also be used to avoid collision with other channels.

FIG. 13 illustrates an example of a PLCM generated using FSCH_ID and BSR_ID identifiers, when one broadcast/multicast service is transmitted via various F-BSCH channels, according to yet another embodiment of the present invention.

Referring to FIG. 13, the generated PLCM includes a channel identifier (FSCH_ID) indicating a specific F-BSCH channel and a specific service flow identifier (BSR_ID) for identifying the data flow of a specific BCMC service being transmitted via the F-BSCH channels. In doing so, the FIRST_BSR_ID identifier, corresponding to the first BCMC_FLOW_ID identifier allocated to the corresponding F-BSCH channel, can be used as the BSR_ID identifier. To complete the 42-bit length of the PLCM, a specific portion or portions can be padded according to a length (n) of a header; specifically, the upper bits of the FSCH_ID identifier portion are filled with 1s or 1s. In other words, the length of the padding depends on the length of the header. For example, if the header length is n, the padding length becomes 32−n, so that upper bits, i.e., next to the header, are filled with 0s or 1s to complete an allocation for the FSCH_ID identifier.

It should be appreciated that each of the embodiments of the present invention can be implemented by modules constructing one mobile terminal or one base station.

Accordingly, the present invention generates the PLCM using a known broadcast/multicast service identifier, thereby facilitating allocation of a PLCM that avoids overlapping currently used PLCMs (or LCMs) and enabling a reduction in delay time.

INDUSTRIAL APPLICABILITY

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A method of receiving a broadcast/multicast service simultaneously via a plurality of forward broadcast supplemental channels of a mobile communication system, the method comprising:

receiving a flow identifier indicative of the broadcast/multicast service; and generating a public long code mask comprising the received flow identifier, a predetermined portion of a channel identifier for identifying a corresponding forward broadcast supplemental channel among the plurality of forward broadcast supplemental channels, and a specific header having a value that does not coincide with previous public long code masks and does not coincide with previous long code masks, wherein the specific header is allocated to a most significant bit portion of the public long code mask, and wherein the channel identifier and the flow identifier are allocated from a least significant bit to a more significant bit, in a portion of the public long code mask to which the specific header is not allocated.

2. The method as claimed in claim 1, wherein the public long code mask has a length of 42 bits.

3. The method as claimed in claim 1, wherein the flow identifier has a length of 32 bits.

4. The method as claimed in claim 1, wherein the channel identifier includes a maximum of seven bits.

5. The method as claimed in claim 4, wherein the predetermined portion is the four least significant bits of the channel identifier.

6. The method as claimed in claim 4, wherein the predetermined portion is the three least significant bits of the channel identifier.

7. The method as claimed in claim 1, wherein a length of the header is variable according to a length of the channel identifier.

8. The method as claimed in claim 7, wherein, if the predetermined portion of the channel identifier is less than n bits, where n<7, the header has a length of 10-n bits.

9. The method as claimed in claim 1, wherein the specific header has a length of seven bits, corresponding to one of 1100001, 1100010, and 1100011.

10. The method as claimed in claim 1, wherein the specific header has a length of six bits, corresponding to one of 110001 and 00xxxx.

11. The method as claimed in claim 1, wherein, if the channel identifier comprises seven bits, the specific header is selected from the group consisting of 110, 000, and 001.

12. The method as claimed in claim 1, wherein, if the flow identifier has a length less than 32 bits, the flow identifier is padded from a most significant bit adjacent the header.

13. The method as claimed in claim 12, wherein, if the flow identifier and the header have lengths of 16 bits and 7 bits, respectively, the flow identifier is padded with twelve bits from the most significant bit adjacent the header.

14. The method as claimed in claim 12, wherein, if the flow identifier and the header have lengths of 24 bits and 7 bits, respectively, the flow identifier is padded with four bits from the most significant bit adjacent the header.

15. The method as claimed in claim 12, wherein, if the flow identifier and the header have lengths of 32 bits and 3 bits, respectively, the flow identifier is not padded.

16. A mobile terminal comprising:

a first module for receiving and storing a flow identifier for a broadcast/multicast service; and a second module for generating a public long code mask to be used in a channel for the broadcast/multicast service upon providing the broadcast/multicast service, the public long code mask comprising the flow identifier, a predetermined portion of a channel identifier for identifying a corresponding forward broadcast supplemental channel among a plurality of forward broadcast supplemental channels, and a specific header, wherein the specific header comprises a value that does not coincide with previous public long code masks, does not coincide with previous long code masks, and the specific header is allocated to a most significant bit portion of the public long code mask, and wherein the channel identifier and the flow identifier are arranged from a least significant bit to a more significant bit, in a portion of the public long code mask to which the specific header is not allocated.

17. The mobile terminal as claimed in claim 16, wherein a length of the header is variable according to a length of the channel identifier.

18. The method as claimed in claim 17, wherein, if the predetermined portion of the channel identifier is less than n bits, where n<7, the header has a length of 10-n bits.

19. The method as claimed in claim 16, wherein the specific header has a length of seven bits, corresponding to one of 1100001, 1100010, and 1100011.

20. The method as claimed in claim 16, wherein, if the channel identifier comprises seven bits, the specific header is selected from the group consisting of 110, 000, and 001.

* * * * *